INVENTOR
GERALD J. CONLEY

United States Patent Office 3,435,553
Patented Apr. 1, 1969

---

3,435,553
LIVE BAIT HOLDERS
Gerald Jay Conley, 344 Arch St., Baird, Tex. 79504
Filed May 25, 1967, Ser. No. 646,139
Int. Cl. A01k 83/06
U.S. Cl. 43—44.8                              1 Claim

ABSTRACT OF THE DISCLOSURE

A bait holder fishing lure member attached to a fish hook adjacent the bight of the hook end and extending toward the loop-eye. The shank portion is made of a flexible wire and terminates in an arrow-headed shaped portion of triangular shape.

---

This invention relates to fishing lures and more specifically to live bait holders of the type adaptable to holding a live minnow in proximity to a regular fish hook without penetration of the flesh of said live bait. Since the arrow-headed shaped clip, constructed of fine music wire of high resilience, is inserted in through the minnows gills and out through its mouth, no injury results nor are its swimming facilities impaired, thus providing an alert and exciting lure for a game fish to strike its natural food. A further accomplishment of this invention is that the time consumed in attaching the minnow to the clip is only a few seconds.

In addition to being ideal for still fishing, where the live and alert minnow moves around in a natural manner, the position of the live bait immediately above and parallel to the shank of the regular fish hook with the head pointed toward the eye of the hook, when being reeled in produces a challenging lure to a game fish.

The objects and achievements of the invention will become more fully apparent from the following detailed description and by reference to the several figures of the drawings thereof in which the various elements are numbered.

Figure 1:
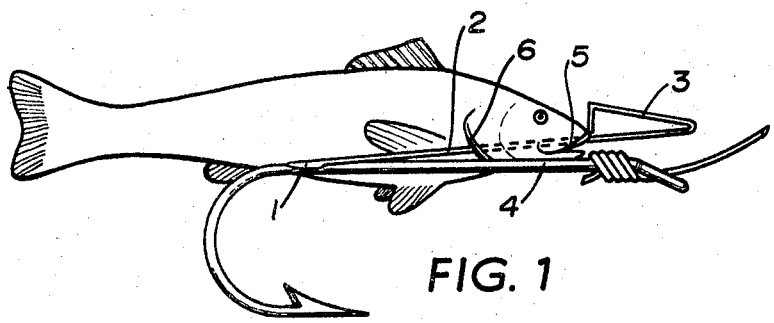
FIGURE 1 is an elevational view of the complete apparatus with the minnow secured ready for casting.

Referring to FIGURE 1, 1 is a spot weld attaching the butt end of the live bait holder 3 to the shank 4 of the ordinary fish hook, 6 shows the manner in which the clip is inserted through the gills of the minnow, and 5 shows the clip extended on through the minnow's mouth.

Figure 2:
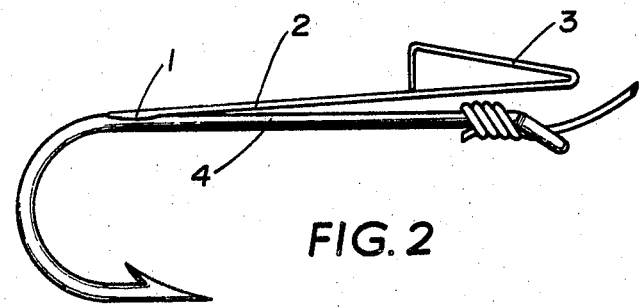
FIGURE 2 is an elevational view of the ordinary fish hook with the clip attached and minus the minnow.

FIGURE 2. Reference character 1 depicts the attachment of the live bait holder 3, adjacent to the bight of the hook.

Figure 3:
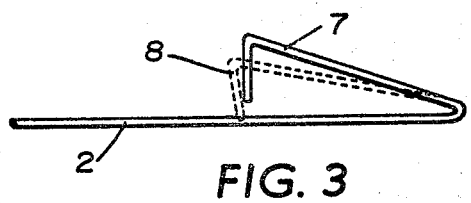
FIGURE 3 is a detached side view of the arrow shaped clip.

FIGURE 3. Reference character 2 shows the stem of the live bait holder, constructed of fine resilient music wire. Reference character 7 depicts the space allowed for depression of the flange of the clip to negotiate the mouth of various sized minnows without injury. The depression is illustrated by 8.

What is claimed here is:

1. The combination of a fish hook and an arrowhead shaped, rearwardly directed minnow holder springingly attached to the shank portion adjacent to the bight of the hook, and constructed of highly resilient music wire, the arrowhead comprising a rearwardly extruding angular portion and a downwardly extending portion terminating in a free end to form a triangular shaped member that is tapered in such a manner as to compress when inserted through the gills and out the mouth of the minnow, and which, when it exits from the mouth, will expand to hold the minnow without need for any further connections.

References Cited

UNITED STATES PATENTS

| | | | |
|---|---|---|---|
| 877,793 | 1/1908 | Murphy | 43—44.2 |
| 1,163,244 | 12/1915 | Lawrence | 43—44.2 |
| 1,249,342 | 12/1917 | Dahl | 43—44.8 |
| 1,325,530 | 12/1919 | Ore | 43—44.2 |
| 1,461,246 | 7/1923 | Lent | 43—44.2 |
| 1,717,376 | 6/1929 | Ellerbroek | 43—44.2 |
| 1,961,378 | 6/1934 | Mitchell | 43—44.8 |
| 2,087,369 | 7/1937 | Woodring | 43—44.8 |
| 2,215,613 | 9/1940 | Hathaway | 43—44.6 |
| 2,608,791 | 9/1952 | Wentz | 43—43.16 X |

ALDRICH F. MEDBERY, *Primary Examiner.*

U.S. Cl. X.R.
43—44.2, 43.16